April 21, 1959 P. HILLMANN 2,882,808
SHUTTER BLADE FOR PHOTOGRAPHIC APPARATUS
Filed April 17, 1957
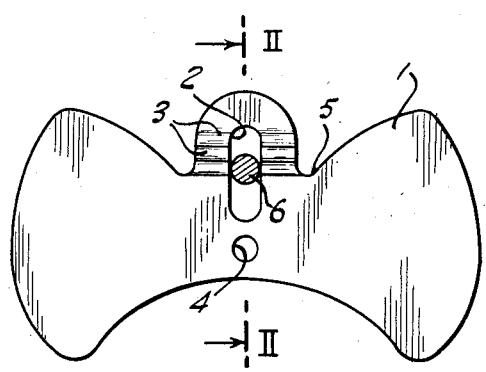
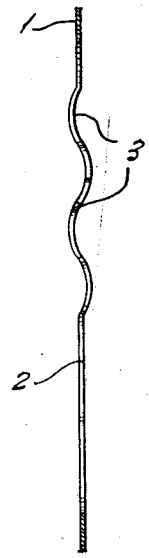
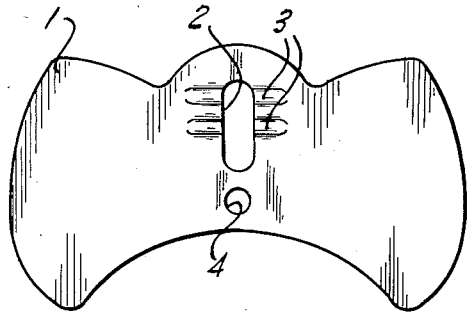
INVENTOR
PAUL HILLMANN

United States Patent Office 2,882,808
Patented Apr. 21, 1959

2,882,808
SHUTTER BLADE FOR PHOTOGRAPHIC APPARATUS

Paul Hillmann, Dresden, Germany, assignor to VEB Zeiss Ikon Dresden, Dresden, Germany Application April 17, 1957, Serial No. 653,365

Claims priority, application Germany April 19, 1956

3 Claims. (Cl. 95—63)

The present invention relates to a shutter blade for photographic apparatus and more particularly to a shutter blade having a slot through which projects the driving pin of the driving mechanism for the shutter blade.

One type of shutter blades in common use have an oblong slot through which a driving pin extends. When such shutter blades are used at high shutter speeds, the forces due to high accelerations and decelerations may be sufficient to produce deformations of the shutter blades. These deformations result from the striking of the driving pin against the flanks or sides of the oblong slot causing damage which renders the blade no longer usable. Efforts have been made to prevent such damage by adding reinforcements to shutter blades. The known types of reinforcements, however, require special tooling and increased manufacturing time and hence involve additional expense.

It is an object of this invention to eliminate the disadvantages referred to. In accordance with this invention the flanks of the blade on both sides of the slot are provided with corrugations in the region of the driving pin. These corrugations may for example be stamped or pressed in the blade. Further, the corrugations preferably extend perpendicularly to the sides of the oblong hole or slot. It is necessary of course that the shutter blade be very accurately flat but the pressing of the corrugations into the blade might cause stresses which warp or distort the blade and destroy its flatness. In order to prevent the occurrence of this defect, the shutter blade is provided with recesses lateral to the slot in the region of the corrugations. With these recesses bounding the corrugations, the latter produce no warping of the blades even when a relatively hard material is used for the manufacture of the blades. Unimpeded rotation of the shutter blades is further assured by forming the corrugations so that they are relatively short and taper or run out within the shutter blade. The particular advantage of the corrugations along the sides or flanks of the slot is that the flanks resist bending and tearing.

The invention will be fully understood from the following description and drawings wherein the invention is shown applied to so-called double-ended blades.

Fig. 1 is a top plan view of a double-ended blade with continuous corrugations;

Fig. 2 is an enlarged cross-sectional view taken through the blade of Fig. 1 on line II—II; and Fig. 3 is a top plan view of a double-ended blade with tapering or running out corrugations.

The blade 1 is generally flat and has a pair of symmetrical wings and a centrally located hole 4 which serves as a bearing point. Further, an oblong hole or slot 2 is provided. A pin 6 of a driving member for the blade projects in known manner into the slot 2. Corrugations 3 are stamped or pressed into the flanks of the blade on both sides of slot 2 and extend perpendicularly to the longitudinal axis of the slot. These corrugations impart to the flanks of the blade a greater resistance to bending. Although not shown, it is obvious that the corrugations might extend in an inclined manner relative to the flanks and that the corrugations may be provided in other types of blades such as oscillating blades. In Fig. 1 slot 2 extends into a small median wing or projection lying between recesses 5, and the corrugations 3 extend to the periphery of the projection. The corrugations may also taper off as indicated in Fig. 3.

The flanks of the blade adjacent pin 6 receive impacts due to high lateral accelerations or decelerations of pin 6. Such impacts might damage the blade and the invention provides a simple and effective means of avoiding such damage. The corrugations 3 formed in the blade strengthen the blade in the region of the slot 2 and thus prevent deformations of the blade due to such impacts. Since the corrugations are confined to a region adjacent slot 2 and the remainder of the blade is flat, the corrugations in the blade do not interfere with its shutter action. The strengthening of the blade by corrugating the portion thereof adjacent pin 6 strengthens the blade without increasing its mass or unbalancing it. The tapering of the corrugations in the manner shown in Fig. 3 reduces stresses which might cause distortions of the blade. The provision of the corrugations therefore affords a simple inexpensive way of preventing the pin from damaging the blade, without any concomitant disadvantages.

While I have shown and described preferred embodiments of my invention, it will be recognized by those skilled in the art that variations and modifications thereof may be made within the spirit and scope of my invention as defined in the following claims.

I claim:

1. A shutter blade for photographic apparatus, said blade having a slot adapted to receive a driving pin for driving action thereof on the sides of the slot, said blade being formed with corrugations therein extending substantially perpendicularly from opposite sides of the slot.

2. A shutter blade as set forth in claim 1, said blade being provided with recesses, and said corrugations extending between said slot and said recesses.

3. A shutter blade as set forth in claim 1, said corrugations running out within said shutter blade.

References Cited in the file of this patent

UNITED STATES PATENTS 2,619,005    Evraets et al. _____ Nov. 25, 1952

FOREIGN PATENTS 95,979    Switzerland _____ June 16, 1938